US00RE50943E

(19) United States
(12) Reissued Patent
Shyu et al.

(10) Patent Number: US RE50,943 E
(45) Date of Reissued Patent: Jul. 7, 2026

(54) HEADBAND FOR HEADPHONES

(71) Applicant: Sonos, Inc., Goleta, CA (US)

(72) Inventors: Vincent Shyu, Seattle, WA (US); Aki Laine, Santa Barbara, CA (US); Dana Krieger, Santa Barbara, CA (US); Philippe Vossel, Cologne (DE)

(73) Assignee: SONOS, INC., Goleta, CA (US)

(21) Appl. No.: 29/977,577

(22) Filed: Dec. 9, 2024

Related U.S. Patent Documents

Reissue of:
(64) Patent No.: Des. 974,327
Issued: Jan. 3, 2023
Appl. No.: 29/864,135
Filed: May 10, 2022

U.S. Applications:
(63) Continuation of application No. 29/737,182, filed on Jun. 5, 2020, now Pat. No. Des. 954,019.

(51) LOC (15) Cl. ..... 14-01
(52) U.S. Cl.
USPC ..... D14/205
(58) Field of Classification Search
USPC ..... D14/205, 206, 207
CPC ..... H04R 25/00; H04R 25/02; H04R 1/1066; H04R 1/1016; H04R 5/033; H04R 5/0335; H04R 1/1091
See application file for complete search history.

(56) References Cited

U.S. PATENT DOCUMENTS 1,396,771 A 11/1921 Minton
1,615,028 A 1/1927 Morser
1,648,832 A 11/1927 Urban
2,420,245 A 5/1947 Hurst
2,782,423 A 2/1957 Simon et al.
2,862,671 A 12/1958 Dimond
(Continued)

FOREIGN PATENT DOCUMENTS

CN 304287819 S 9/2017
CN 306928266 S 11/2021
(Continued)

OTHER PUBLICATIONS

Bluetooth Headest 2018 Products Catalogue, Saiyo Electronics Co., Ltd, Patent Office Design Division publication No. HD30005951, Oct. 17, 2018, p. 5, 3 pgs.
(Continued)

*Primary Examiner* — Philip S Hyder
(74) *Attorney, Agent, or Firm* — Workman Nydegger

(57) CLAIM

The ornamental design for a [headphone] *headband for headphones* as shown and described.

DESCRIPTION

FIG. 1 is a perspective view of a [headphone] *headband for headphones* showing the new design;
FIG. 2 is a second perspective view thereof.
FIG. 3 is a front elevation view thereof.
FIG. 4 is a rear elevation view thereof.
FIG. 5 is a left side elevation view thereof.
FIG. 6 is a right side elevation view thereof.
FIG. 7 is a top plan view thereof; and,
FIG. 8 is a bottom plan view thereof.
The features shown in broken lines do not form part of the claimed design.

1 Claim, 7 Drawing Sheets

Figure 1:
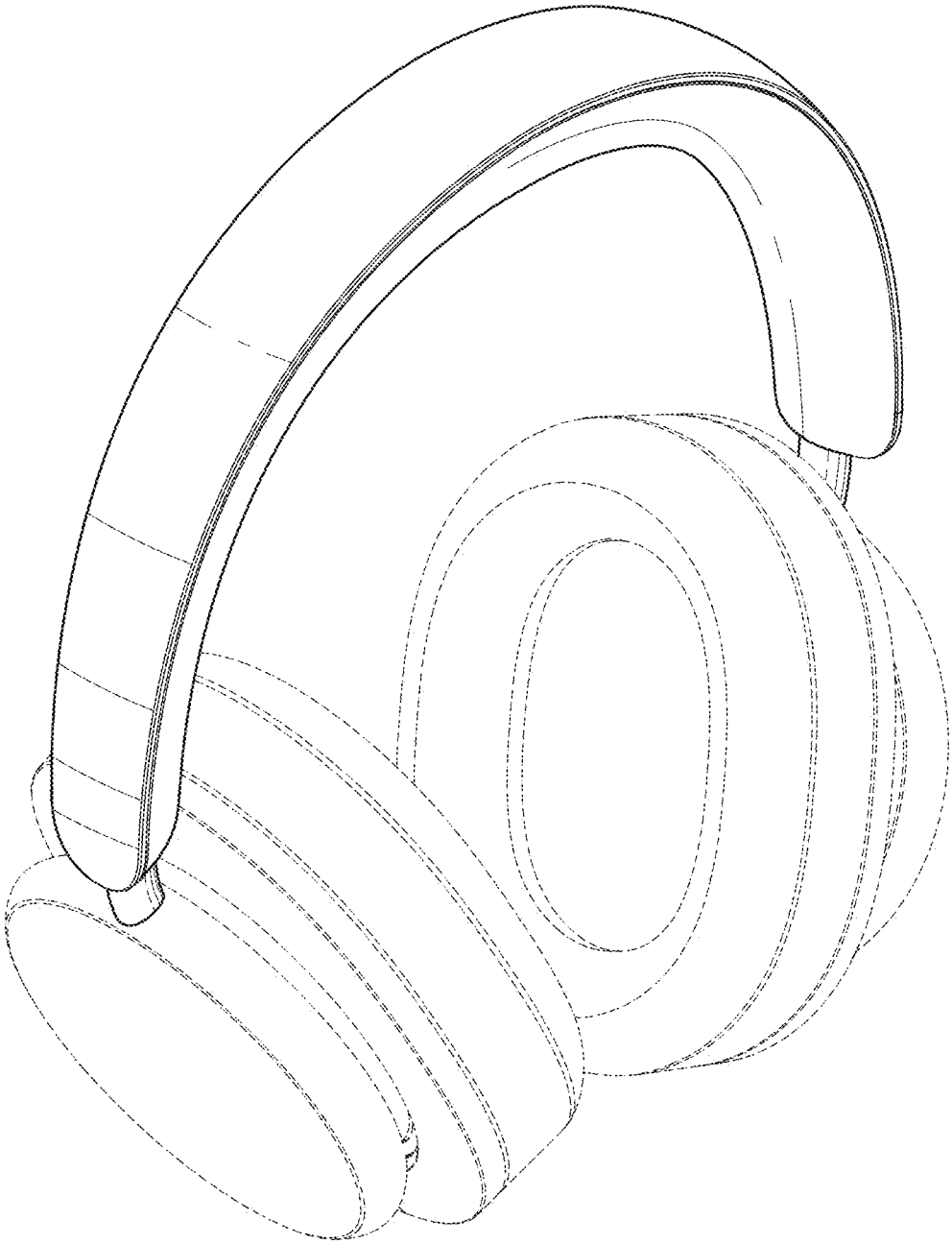
Figure 2:
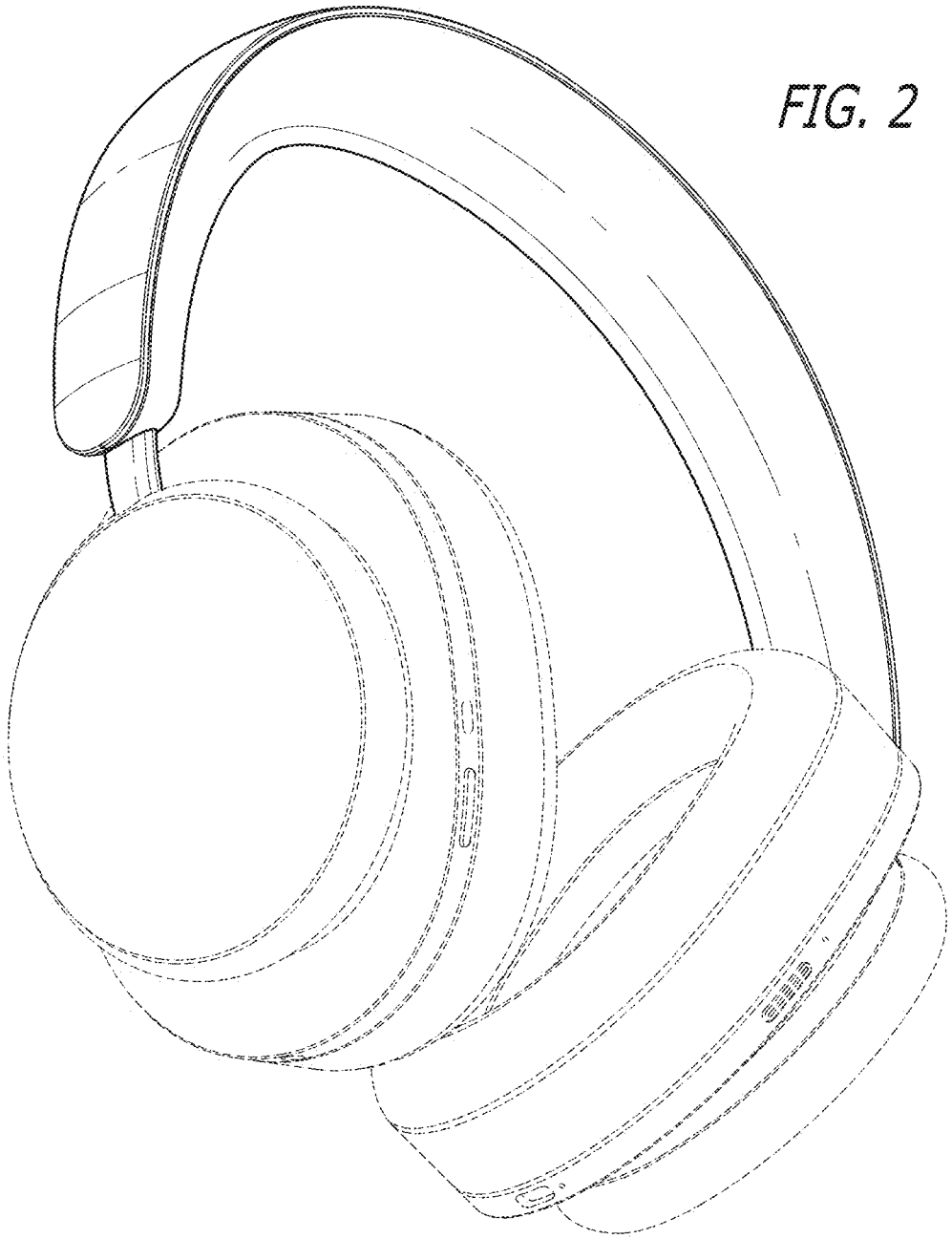
Figure 3:
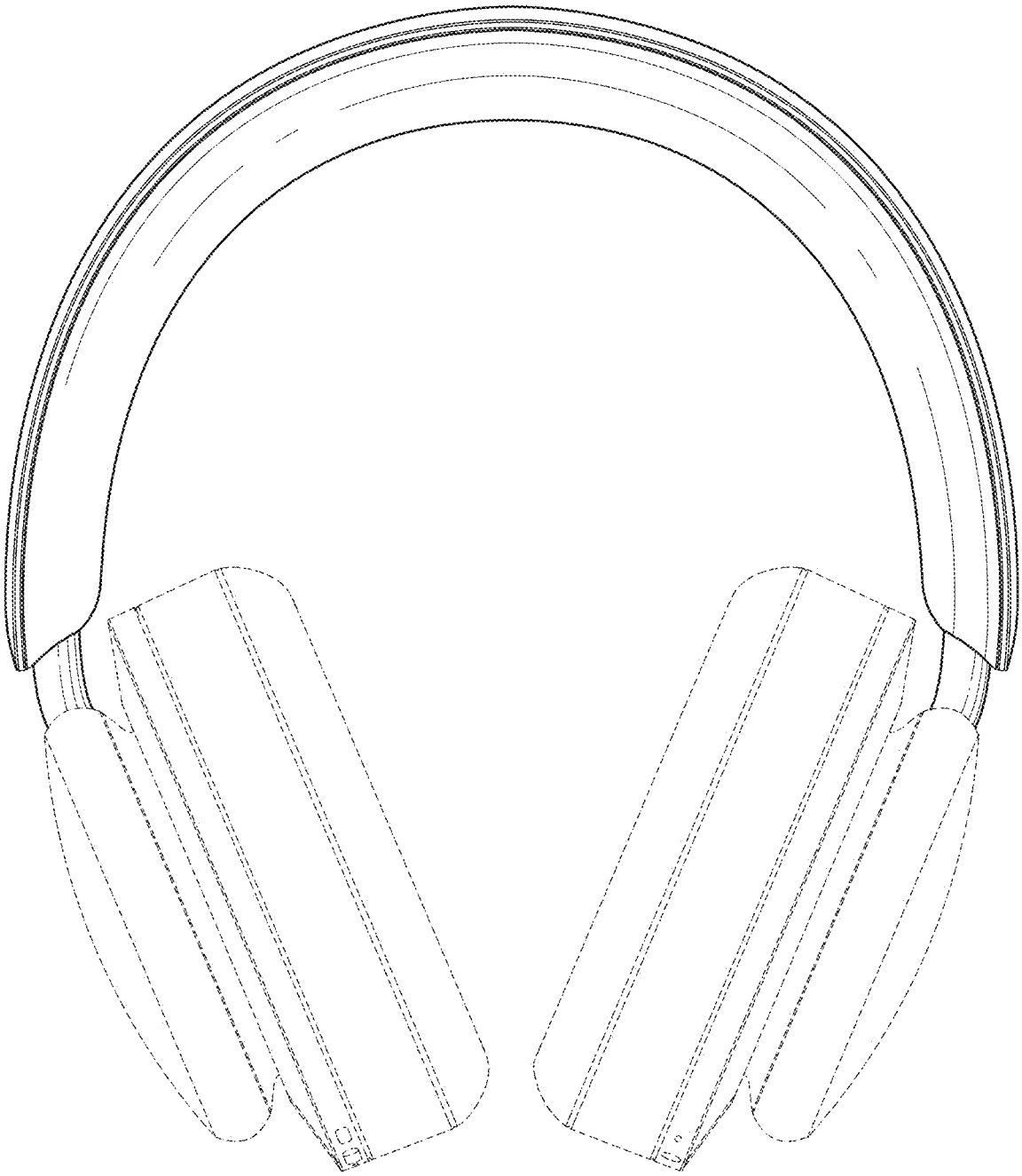
Figure 4:
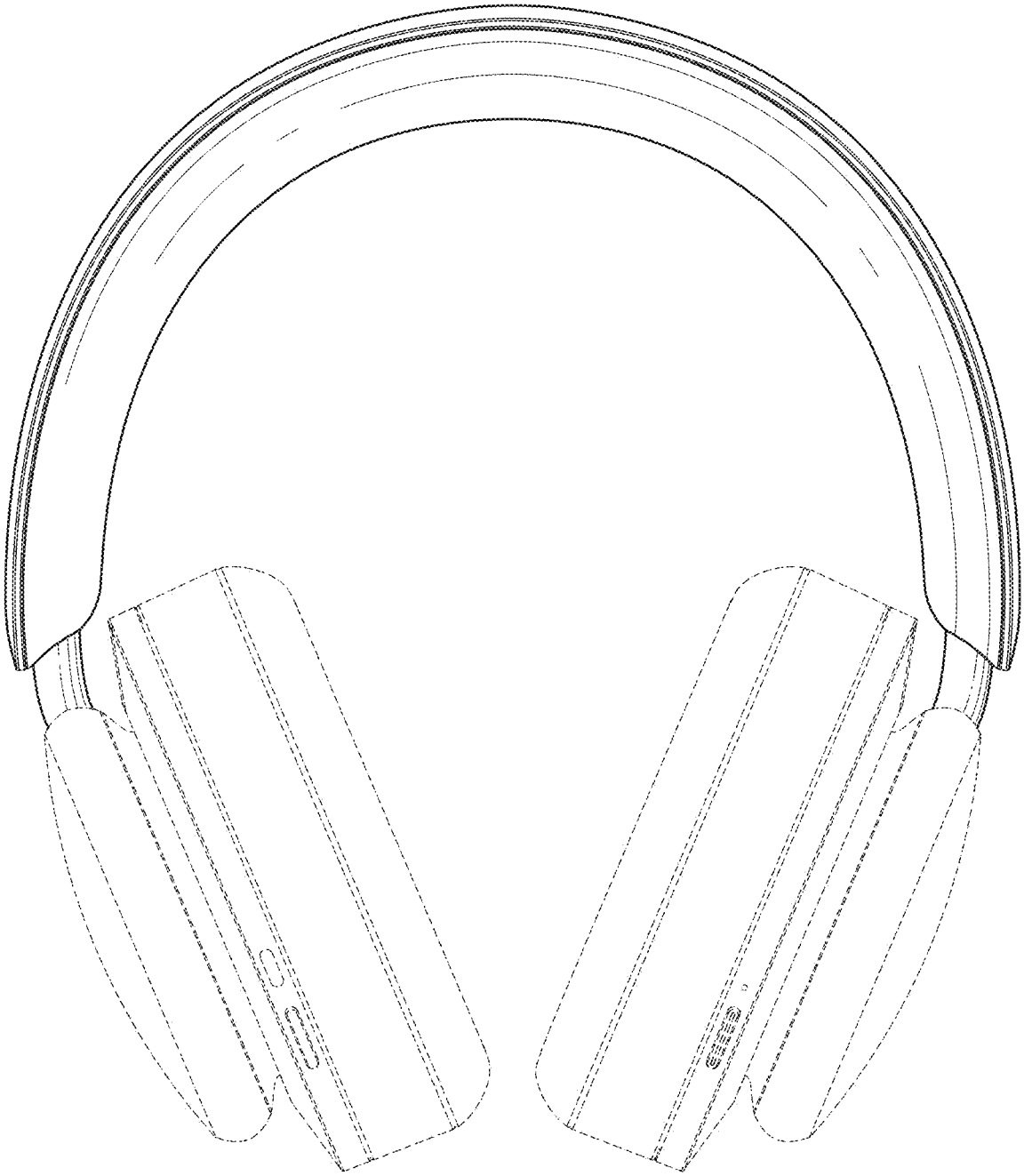
Figure 5:
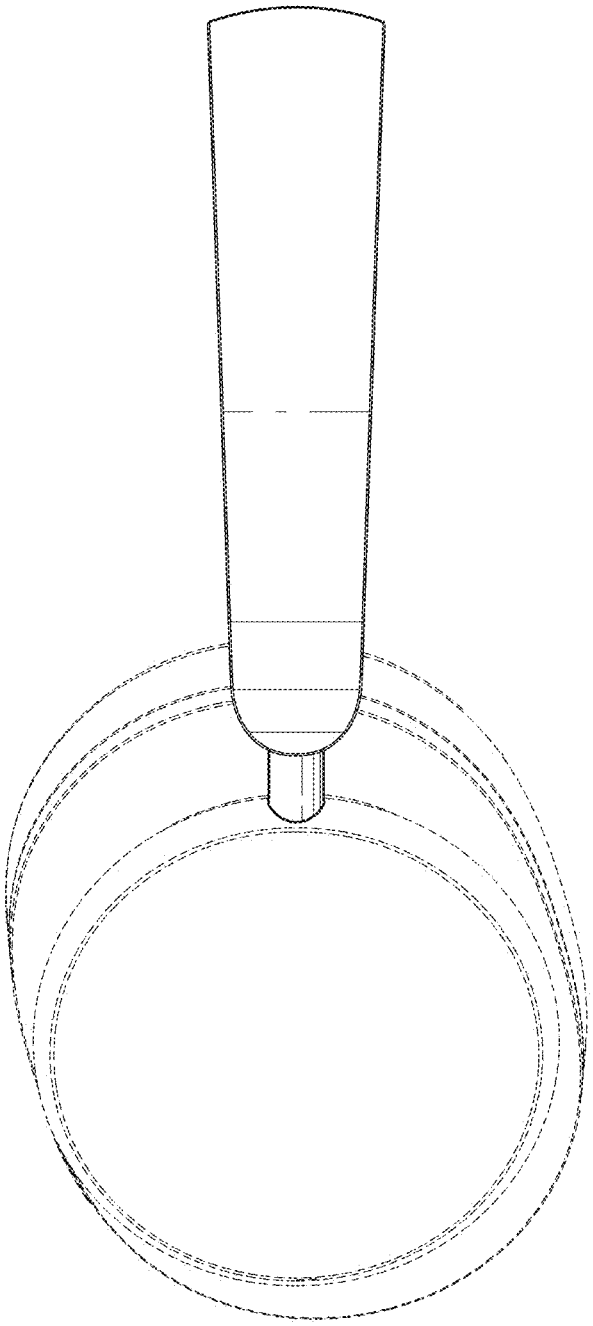
Figure 6:
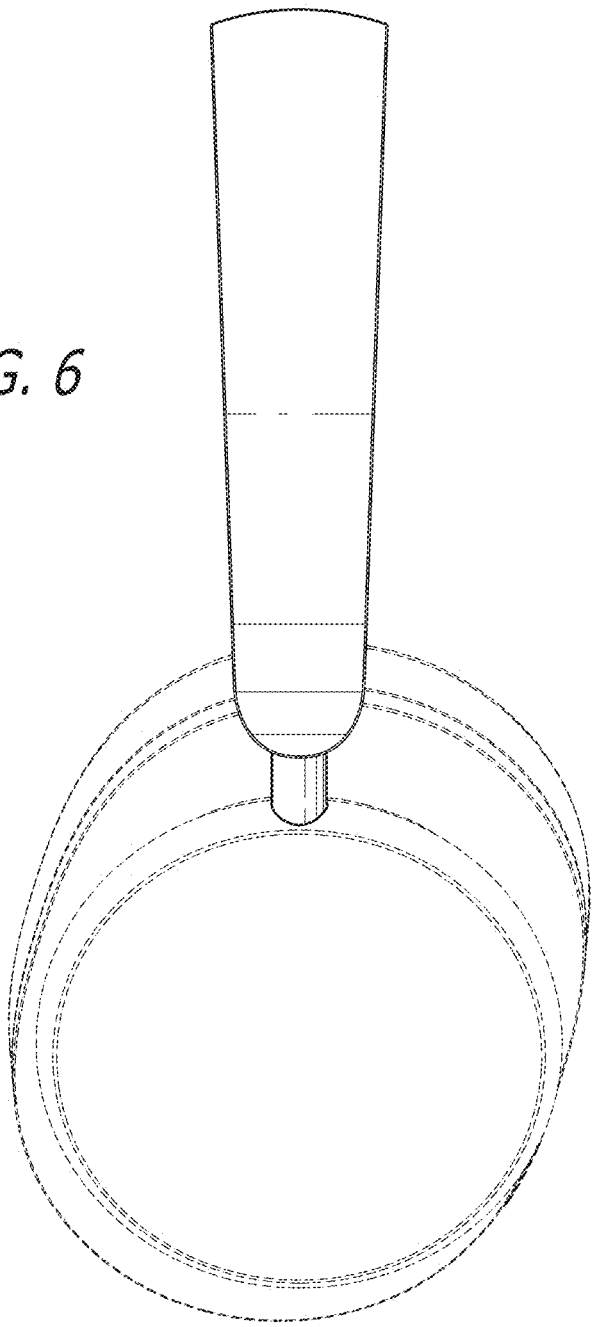
Figure 7:
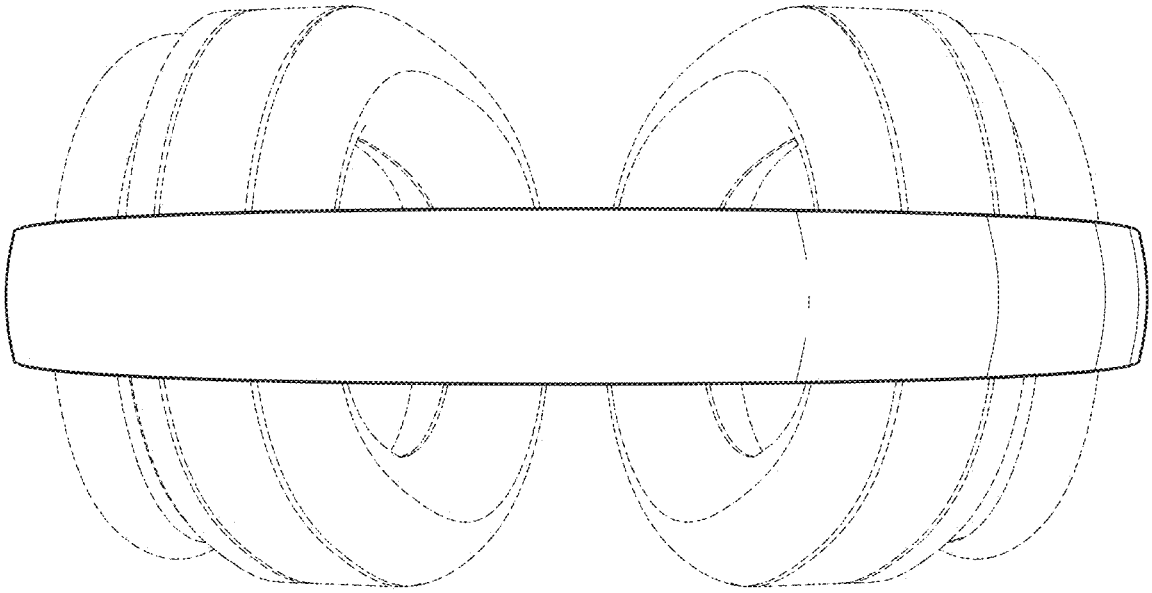
Figure 8:
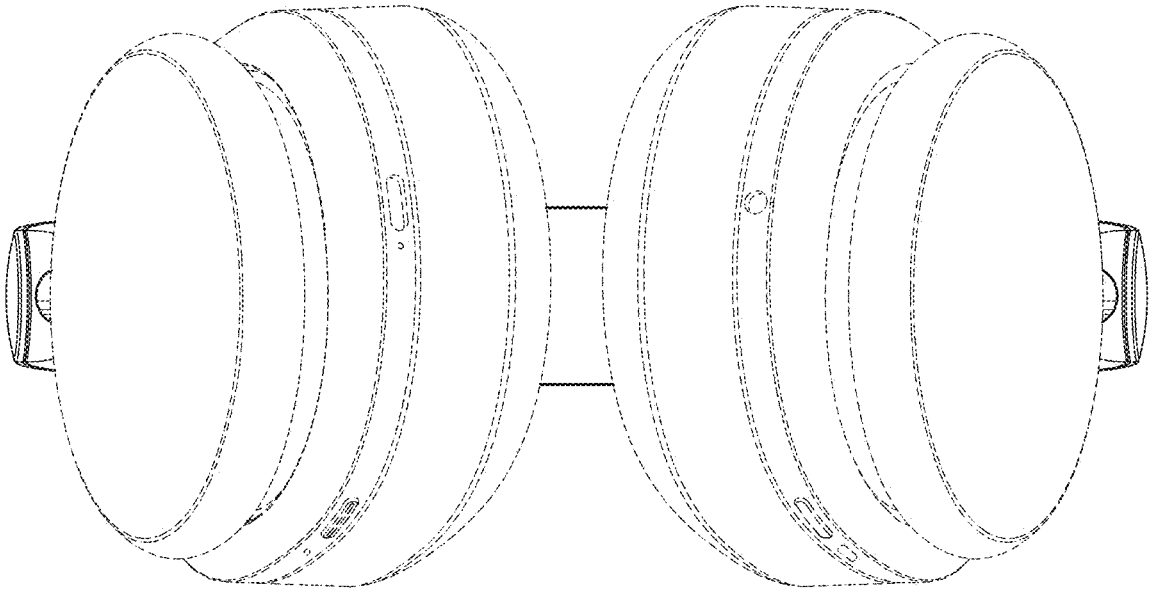

Matter enclosed in heavy brackets [ ] appears in the original patent but forms no part of this reissue; matter printed in italics indicates the additions made by reissue.

(56) References Cited

U.S. PATENT DOCUMENTS 3,051,961 A 9/1962 Clark
3,211,160 A 10/1965 Miller
3,220,505 A 11/1965 Hargrave
3,454,964 A 7/1969 Brinkhoff
3,488,457 A 1/1970 Lahti
3,530,509 A 9/1970 Simpson et al.
3,588,914 A 6/1971 Ihnat, Jr.
3,596,733 A 8/1971 Bertagni
D222,547 S 11/1971 Kantor
D235,210 S 5/1975 Hill
D239,787 S 5/1976 Lonnstedt
D244,300 S 5/1977 Besasie
D246,259 S 11/1977 Nishimura et al.
D246,519 S 11/1977 Kato
D254,616 S 4/1980 Tabata
D255,352 S 6/1980 Besasie
4,385,209 A 5/1983 Greason et al.
4,465,159 A 8/1984 Stallings
D276,855 S 12/1984 Falco
D299,337 S 1/1989 Wiegel
D313,092 S 12/1990 Nilsson
5,018,599 A 5/1991 Dohi et al.
5,035,005 A 7/1991 Hung
D322,071 S 12/1991 Bergin et al.
D328,074 S 7/1992 Yamazaki et al.
5,144,678 A 9/1992 Lenz
5,233,650 A 8/1993 Chan
5,243,709 A 9/1993 Sheehan et al.
5,293,647 A 3/1994 Mirmilshteyn et al.
5,384,857 A 1/1995 Nordin et al.
5,500,958 A 3/1996 Falco
5,640,458 A 6/1997 Nishiguchi et al.
D385,665 S 10/1997 Westerdal
5,786,593 A 7/1998 Ohtomo et al.
5,826,597 A 10/1998 Chou
5,937,872 A 8/1999 Wang
5,996,123 A 12/1999 Leight et al.
D431,550 S 10/2000 Yoneda
6,236,969 B1 5/2001 Ruppert et al.
6,449,806 B1 9/2002 Engelhard et al.
6,564,390 B2 5/2003 Vernon
D505,411 S 5/2005 Sakai
6,993,143 B2 1/2006 Harris et al.
D538,261 S 3/2007 Taylor et al.
D544,650 S 6/2007 Westerdal
D573,581 S 7/2008 Gondo et al.
D576,604 S 9/2008 Suzuki
D582,890 S 12/2008 Koza et al.
D589,492 S 3/2009 Mistry
D603,370 S 11/2009 Suzuki
D625,705 S 10/2010 Ohori et al.
D633,471 S 3/2011 Sugiyama
D633,895 S 3/2011 Morimoto
D635,959 S 4/2011 Hutchieson
D637,497 S 5/2011 Lee
D638,397 S 5/2011 Mcmanigal
8,006,320 B1 * 8/2011 Rohbani ..... A61F 11/12 2/209
D649,527 S 11/2011 Lee et al.
D649,956 S 12/2011 Gresko et al.
D651,586 S 1/2012 Lee et al.
D651,764 S 1/2012 Gresko et al.
8,098,872 B2 1/2012 Chang
D657,344 S 4/2012 Brunner et al.
D657,345 S 4/2012 Brunner et al.
8,234,395 B2 7/2012 Millington
D666,992 S 9/2012 Lee et al.
D668,633 S 10/2012 Enquist
8,295,529 B2 10/2012 Petersen et al.
D672,744 S 12/2012 Scarpa
D672,745 S 12/2012 Abed et al.
D672,875 S 12/2012 Ishibashi et al.
D678,859 S 3/2013 Lee
D683,329 S 5/2013 Hagelin
D684,141 S 6/2013 Takamoto
8,483,853 B1 7/2013 Lambourne
D688,649 S 8/2013 Combs et al.
D691,583 S 10/2013 Kitayama
D695,261 S 12/2013 Katsumata
D697,048 S 1/2014 Pavitsich
D697,897 S 1/2014 Lee et al.
D699,702 S 2/2014 Chen
8,646,466 B2 2/2014 Howard et al.
8,755,555 B2 6/2014 Dougherty et al.
D708,163 S * 7/2014 Ishikura ..... D14/205
8,767,996 B1 7/2014 Lin et al.
8,774,442 B2 7/2014 Huang
8,794,248 B2 8/2014 Defenbaugh et al.
8,818,011 B2 8/2014 Chen
D712,871 S 9/2014 McNamara
D716,255 S * 10/2014 Cho ..... D14/205
D729,193 S 5/2015 Kirsch et al.
D733,090 S 6/2015 Petersen
D736,176 S 8/2015 Rapitsch
D739,842 S 9/2015 Birger
D741,007 S 10/2015 McNama
D750,041 S 2/2016 Birger
9,344,794 B1 5/2016 Blonder
D759,626 S * 6/2016 Wagner ..... D14/205
D763,226 S 8/2016 Petersen
D768,111 S * 10/2016 Nam ..... D14/205
D787,469 S * 5/2017 Djohar ..... D14/205
D787,470 S 5/2017 Kelly et al.
D793,357 S * 8/2017 Afshar ..... D14/205
D800,691 S 10/2017 Ando et al.
D813,837 S 3/2018 Paterson
D815,615 S 4/2018 Wernblad
10,027,299 B2 7/2018 Rose et al.
D826,894 S 8/2018 Zhang
D826,895 S 8/2018 Sharp et al.
D830,222 S 10/2018 Silvestri
D830,333 S 10/2018 Carr
D830,334 S 10/2018 Carr
D830,993 S 10/2018 Petersen et al.
D833,071 S * 11/2018 Pennington ..... D28/41
D837,763 S 1/2019 Suzuki
D838,687 S 1/2019 Wu
D840,971 S 2/2019 Summerson et al.
D842,270 S 3/2019 Chen
D848,395 S 5/2019 Kelley
D849,712 S 5/2019 Billaudet et al.
D851,622 S 6/2019 Billaudet et al.
D851,839 S 6/2019 Scanlon
D855,033 S 7/2019 Martin et al.
D857,652 S 8/2019 Wang
D858,481 S 9/2019 Saule et al.
D859,353 S * 9/2019 Wagner ..... D14/205
D860,163 S * 9/2019 Xia ..... D14/205
10,405,081 B2 9/2019 Hviid et al.
D861,636 S 10/2019 Carr
D868,025 S 11/2019 Brace
10,484,793 B1 11/2019 Peterson et al.
D871,368 S * 12/2019 Saule ..... D14/205
D872,049 S 1/2020 Saule et al.
D876,388 S * 2/2020 Carr ..... D14/205
D877,714 S 3/2020 Dhondt et al.
D878,327 S 3/2020 Dhondt et al.
D881,475 S 4/2020 Xu
10,694,309 B1 6/2020 Vautrin et al.
D890,123 S 7/2020 Yoshimura
D891,397 S 7/2020 Zeng
10,757,499 B1 8/2020 Vautrin et al.
D900,782 S 11/2020 Vaclavik et al.
D902,496 S 11/2020 Bui
D905,001 S 12/2020 Enqvist et al.
D905,005 S 12/2020 Liu
D909,988 S 2/2021 Vaclavik et al.
D913,990 S * 3/2021 Saule ..... D14/206
D916,047 S 4/2021 Xiao
D918,171 S 5/2021 Nakayama et al.
D920,283 S 5/2021 Levine et al.
11,006,206 B2 5/2021 Morris et al.
D928,114 S 8/2021 Terazaki
11,109,135 B1 * 8/2021 Corona Aparicio . H04R 1/1066

(56) References Cited

U.S. PATENT DOCUMENTS

| | | | | |
|---|---|---|---|---|
| D930,331 | S | | 9/2021 | Plant et al. |
| D934,198 | S | | 10/2021 | Michaelian et al. |
| 11,153,678 | B1 | | 10/2021 | Jorgovanovic et al. |
| 11,184,696 | B1 | | 11/2021 | Li et al. |
| D938,934 | S | | 12/2021 | Tsubone et al. |
| D944,759 | S | * | 3/2022 | Vaclavik ..... D14/205 |
| 11,265,640 | B2 | | 3/2022 | Peeters et al. |
| 11,278,098 | B2 | | 3/2022 | Malkin |
| 11,290,825 | B1 | | 3/2022 | Ko et al. |
| D954,019 | S | | 6/2022 | Shyu et al. |
| D961,545 | S | | 8/2022 | Ahovi et al. |
| D969,774 | S | | 11/2022 | Bellham et al. |
| 11,533,564 | B2 | | 12/2022 | Roberts et al. |
| D974,327 | S | | 1/2023 | Shyu et al. |
| D976,228 | S | | 1/2023 | Zheng et al. |
| D985,529 | S | | 5/2023 | Wagner |
| D986,215 | S | | 5/2023 | Jrgensen |
| D987,598 | S | | 5/2023 | Lin et al. |
| D990,450 | S | | 6/2023 | Xiong et al. |
| D991,214 | S | | 7/2023 | Roberts et al. |
| D991,218 | S | | 7/2023 | He |
| D991,904 | S | | 7/2023 | Wagner |
| D995,470 | S | | 8/2023 | Wagner |
| D995,471 | S | | 8/2023 | Wagner |
| 11,758,317 | B1 | | 9/2023 | Vautrin et al. |
| D1,004,570 | S | | 11/2023 | Fu |
| D1,008,230 | S | | 12/2023 | Cheng |
| D1,012,062 | S | | 1/2024 | Hu |
| D1,014,457 | S | | 2/2024 | Zhong et al. |
| D1,019,598 | S | | 3/2024 | Yoshikawa et al. |
| D1,019,600 | S | | 3/2024 | Shyu et al. |
| 11,937,042 | B2 | | 3/2024 | Saule et al. |
| 11,962,964 | B2 | | 4/2024 | Neergaard et al. |
| D1,026,855 | S | | 5/2024 | Lee et al. |
| D1,034,517 | S | | 7/2024 | Liu |
| D1,035,611 | S | | 7/2024 | Tsubone et al. |
| D1,039,512 | S | | 8/2024 | Chatterjee et al. |
| D1,045,822 | S | | 10/2024 | Liu |
| D1,051,089 | S | | 11/2024 | Lindenberger |
| D1,051,874 | S | | 11/2024 | Dryden et al. |
| D1,055,024 | S | | 12/2024 | Shyu et al. |
| D1,059,327 | S | | 1/2025 | Prentice et al. |
| D1,060,303 | S | | 2/2025 | Chen |
| D1,061,472 | S | | 2/2025 | Prentice et al. |
| D1,062,689 | S | | 2/2025 | Gu |
| D1,070,809 | S | | 4/2025 | Shyu et al. |
| D1,077,773 | S | | 6/2025 | Xiong et al. |
| 12,335,677 | B2 | | 6/2025 | Neergaard et al. |
| D1,082,744 | S | | 7/2025 | Prentice et al. |
| D1,092,435 | S | | 9/2025 | Xia |
| D1,098,070 | S | | 10/2025 | Prentice et al. |
| D1,100,880 | S | | 11/2025 | Shyu et al. |
| D1,102,403 | S | | 11/2025 | Xu et al. |
| 2002/0159833 | A1 | | 10/2002 | Nabeshima |
| 2006/0027245 | A1 | | 2/2006 | Spector |
| 2006/0162046 | A1 | | 7/2006 | Chudzik et al. |
| 2009/0041285 | A1 | | 2/2009 | Parkins et al. |
| 2009/0183751 | A1 | | 7/2009 | Tu |
| 2010/0158301 | A1 | | 6/2010 | Kuhtz et al. |
| 2010/0180754 | A1 | | 7/2010 | Brown et al. |
| 2011/0123059 | A1 | | 5/2011 | Hu |
| 2011/0182454 | A1 | | 7/2011 | Larsen et al. |
| 2012/0140973 | A1 | | 6/2012 | Olodort et al. |
| 2012/0285480 | A1 | | 11/2012 | Howard et al. |
| 2013/0034259 | A1 | | 2/2013 | Xiong et al. |
| 2013/0272560 | A1 | | 10/2013 | Dougherty et al. |
| 2014/0102472 | A1 | | 4/2014 | Hirschoff et al. |
| 2014/0111415 | A1 | | 4/2014 | Gargi et al. |
| 2014/0363016 | A1 | | 12/2014 | Blonder |
| 2015/0222977 | A1 | | 8/2015 | Angel, Jr. |
| 2015/0378546 | A1 | | 12/2015 | Osborne et al. |
| 2016/0050486 | A1 | | 2/2016 | Uggla |
| 2016/0106192 | A1 | | 4/2016 | Swartz et al. |
| 2016/0183656 | A1 | | 6/2016 | Karam |
| 2016/0193085 | A1 | | 7/2016 | Jenkins et al. |
| 2016/0210956 | A1 | | 7/2016 | Huang |
| 2017/0192739 | A1 | | 7/2017 | Gossain et al. |
| 2017/0230746 | A1 | | 8/2017 | Silvestri |
| 2017/0242653 | A1 | | 8/2017 | Lang et al. |
| 2017/0330539 | A1 | | 11/2017 | Little et al. |
| 2017/0353780 | A1 | | 12/2017 | Huang et al. |
| 2017/0366892 | A1 | | 12/2017 | Wallace et al. |
| 2018/0069815 | A1 | | 3/2018 | Fontana et al. |
| 2018/0107446 | A1 | | 4/2018 | Wilberding et al. |
| 2019/0069074 | A1 | | 2/2019 | Yamkovoy |
| 2019/0104353 | A1 | | 4/2019 | Ishikawa et al. |
| 2019/0189106 | A1 | | 6/2019 | Hull et al. |
| 2019/0189196 | A1 | | 6/2019 | Robison et al. |
| 2019/0289379 | A1 | | 9/2019 | Wu |
| 2019/0313179 | A1 | * | 10/2019 | Saule ..... H04R 19/02 |
| 2020/0077172 | A1 | | 3/2020 | England et al. |
| 2020/0145747 | A1 | | 5/2020 | Bunney et al. |
| 2020/0275647 | A1 | | 9/2020 | Melamed |
| 2020/0322709 | A1 | | 10/2020 | Schoeck et al. |
| 2020/0322710 | A1 | | 10/2020 | Peeters et al. |
| 2020/0387719 | A1 | | 12/2020 | Jung |
| 2020/0389719 | A1 | * | 12/2020 | Morris ..... H04R 5/0335 |
| 2020/0413170 | A1 | * | 12/2020 | Liu ..... H04R 1/02 |
| 2021/0100689 | A1 | | 4/2021 | Himuro et al. |
| 2022/0014837 | A1 | | 1/2022 | Kikuchi et al. |
| 2022/0086548 | A1 | | 3/2022 | Bloom |
| 2022/0116708 | A1 | | 4/2022 | Roberts, Jr. et al. |
| 2022/0279267 | A1 | | 9/2022 | Johnson et al. |
| 2022/0286767 | A1 | | 9/2022 | Neergaard et al. |
| 2023/0164488 | A1 | | 5/2023 | Degner et al. |
| 2023/0179900 | A1 | | 6/2023 | Tseng et al. |
| 2023/0224615 | A1 | | 7/2023 | Barrieau et al. |
| 2024/0089645 | A1 | | 3/2024 | Lee et al. |
| 2024/0117796 | A1 | | 4/2024 | Ni et al. |
| 2025/0280220 | A1 | | 9/2025 | Koyama et al. |

FOREIGN PATENT DOCUMENTS

| | | | | |
|---|---|---|---|---|
| CN | 307129808 | S | | 2/2022 |
| CN | 307211675 | S | | 3/2022 |
| CN | 308382034 | S | | 12/2023 |
| CN | 308598770 | S | | 4/2024 |
| CN | 309449389 | S | | 8/2025 |
| CN | 309498341 | S | | 9/2025 |
| CN | 309709645 | S | | 12/2025 |
| EM | 008069306-0001 | | | 8/2020 |
| EM | 008306104-0001 | | | 12/2020 |
| EM | 008306104-0002 | | | 12/2020 |
| EM | 008306104-0003 | | | 12/2020 |
| EM | 008306104-0004 | | | 12/2020 |
| EM | 008306104-0005 | | | 12/2020 |
| EM | 008306104-0006 | | | 12/2020 |
| EM | 008308431-0001 | | | 12/2020 |
| EM | 008308431-0002 | | | 12/2020 |
| EM | 008308431-0003 | | | 12/2020 |
| EM | 008308431-0004 | | | 12/2020 |
| EM | 008308431-0005 | | | 12/2020 |
| EM | 008308431-0006 | | | 12/2020 |
| EM | 008308431-0007 | | | 12/2020 |
| EM | 008308431-0008 | | | 12/2020 |
| EM | 008313035-0001 | | | 12/2020 |
| EM | 008507867-0001 | | | 4/2021 |
| EM | 009101447-0001 | | * | 7/2022 |
| EP | 3920549 | A1 | | 12/2021 |
| GB | 9003743228-0001 | | | 2/2017 |
| GB | 9006268900-0001 | | | 2/2019 |
| GB | 9008057400-0001 | | | 7/2020 |
| GB | 9008277826-0002 | | | 11/2020 |
| GB | 9008306104-0001 | | | 12/2020 |
| GB | 9008306104-0002 | | | 12/2020 |
| GB | 9008306104-0003 | | | 12/2020 |
| GB | 9008306104-0004 | | | 12/2020 |
| GB | 9008306104-0005 | | | 12/2020 |
| GB | 9008306104-0006 | | | 12/2020 |
| GB | 9008308431-0004 | | | 12/2020 |
| IN | 334368-001-001 | | | 10/2020 |
| IN | 334368-001-0001 | | | 1/2022 |
| JP | 05-292589 | A | | 11/1993 |
| JP | 1502702 | S | | 6/2014 |

(56) References Cited

FOREIGN PATENT DOCUMENTS

| | | | |
|---|---|---|---|
| JP | 1526957 | S | 5/2015 |
| JP | 1617671 | S | 10/2018 |
| JP | 1673628 | S | 11/2020 |
| JP | 1701262 | S | 11/2021 |
| JP | 1706404 | S | 1/2022 |
| JP | 1730548 | S | 11/2022 |
| JP | 1751758 | S | 8/2023 |
| JP | 1772590 | S | 6/2024 |
| JP | 1794378 | S | 3/2025 |
| JP | 1794380 | S | 3/2025 |
| KR | 30-0997026 | | 3/2019 |

OTHER PUBLICATIONS

Notice of Allowance received for U.S. Appl. No. 29/993,105, mailed on May 16, 2025, 9 pages.
Notice of Allowance received for U.S. Appl. No. 29/873,483, mailed on Oct. 11, 2024, 8 pages.
Notice of Allowance received for U.S. Appl. No. 29/979,999, mailed on Apr. 1, 2025, 10 pages.
Requirement for Restriction/Election received for U.S. Appl. No. 29/873,483, mailed on Jul. 1, 2024, 8 pages.
Notice of Allowance received for U.S. Appl. No. 29/979,999, mailed on Sep. 16, 2025, 2 pages.
Notice of Allowance received for U.S. Appl. No. 29/993,105, mailed on Sep. 15, 2025, 2 pages.
Notice of Allowance received for U.S. Appl. No. 30/023,551, mailed on Nov. 12, 2025, 9 pages.
Notice of Allowance received for U.S. Appl. No. 29/979,999, mailed on Aug. 18, 2025, 2 pages.
Notice of Allowance received for U.S. Appl. No. 29/993,105, mailed on Aug. 18, 2025, 2 pages.
Corrected Notice of Allowance received for U.S. Appl. No. 29/971,755, mailed on Dec. 20, 2024, 5 pages.
Notice of Allowance received for U.S. Appl. No. 29/926,153, mailed on Aug. 20, 2024, 8 pages.
Notice of Allowance received for U.S. Appl. No. 29/926,153, mailed on May 13, 2024, 6 pages.
Notice of Allowance received for U.S. Appl. No. 29/971,755, mailed on Dec. 16, 2024, 11 pages.
Notice of Allowance received for U.S. Appl. No. 29/979,999, mailed on Jul. 2, 2025, 8 pages.
Notice of Allowance received for U.S. Appl. No. 29/993,105, mailed on Apr. 1, 2025, 9 pages.
Notice of Allowance received for U.S. Appl. No. 29/993,105, mailed on Jul. 2, 2025, 9 pages.
Notice of Allowance received for U.S. Appl. No. 29/993,105, mailed on Jul. 16, 2025, 2 pages.
Notification of Refusal to WIPO received for CN Application No. 202460001992.0 and International registration No. DM/234841, mailed on Jul. 24, 2025, 3 Pages.
Office Action received for Japanese Patent Application No. 2023-020717, mailed on Feb. 27, 2024, 3 pages (1 page of English Translation and 2 pages of Original Document).
Restriction Requirement received for U.S. Appl. No. 30/022,547, mailed on Jan. 12, 2026, 9 pages.
Ex Parte Quayle Action received for U.S. Appl. No. 30/043,678, mailed on Feb. 13, 2026, 9 pages.
Notice of Allowance received for U.S. Appl. No. 30/023,551, mailed on Mar. 10, 2026, 9 pages.
Notice of Allowance received for U.S. Appl. No. 30/022,547, mailed on Mar. 19, 2026, 8 pages.
Notice of Allowance received for U.S. Appl. No. 30/022,547, mailed on Mar. 31, 2026, 2 pages.
Notice of Allowance received for U.S. Appl. No. 30/043,678, mailed on Apr. 9, 2026, 6 pages.
"Get Navi", Gakken Publishing Co., Ltd., HA30004687, Jul. 30, 2018, vol. 20, No. 9, p. 3, 3 pages.
"Premium Headphone Guide Magazine", Ongen Publishing Co., Ltd., RA02005238, May 25, 2020, vol. 14, p. 87, 3 pages.
Ali, "B&O Beoplay H8i review", techradar, Apr. 23, 2018, retrieved from https://www.techradar.com/reviews/bando-beoplay-h8i on Aug. 20, 2020, 21 pgs.
Bernard, "The Bowers & Wilkins PX headphones offer big sound at a high price", techcrunch, Jan. 22, 2018, retrieved from https://techcrunch.com/2018/01/22/review-bowers-and-wilkins-px-wireless-headphones/ on Aug. 21, 2020, 13 pgs.
Bhalla, "Bose Quiet Comfort 35 II Review: Easily The Best Wireless Noise-Cancelling Headphones Yet", mensxp, Jan. 26, 2018, retrieved from https://www.mensxp.com/technology/reviews/42230-bose-quiet-comfort-35-ii-review-easily-the-best-wireless-noise-cancelling-headphones-yet.html on Aug. 20, 2020, 24 pgs.
Carnoy, "Microsoft Surface Headphones: Hands-on with Microsoft's new Bose-buster noise-canceling headphones", cnet, Oct. 2, 2018, retrieved from https://www.cnet.com/reviews/microsoft-surface-headphones-preview/ on Aug. 20, 2020, 12 pgs.
Krol, "Beoplay H4 review: Pricey, but you can hear what you pay for", Mashable, Jul. 5, 2018, retrieved from https://mashable.com/2018/07/05/beoplay-h4-review/ on Aug. 20, 2020, 26 pgs.
Savov, "Sony 1000X M3 Review: Supreme Noise Canceling", The Verge, Sep. 11, 2018, retrieved from https://www.theverge.com/2018/9/11/17844914/sony-1000x-m3-review-noise-canceling-headphones on Aug. 20, 2020, 11 pgs.
Stark, "Beats' best: Beats Studio 3 Wireless reviewed", pickr, May 31, 2018, retrieved from https://www.pickr.com.au/reviews/2018/beats-studio-3-wireless-headphones/ on Aug. 20, 2020, 25 pgs.
Steele, "B&O Beoplay H8i and H9i headphones review: Diminishing returns", engadget, Apr. 28, 2018, retrieved from https://www.engadget.com/2018-04-28-bang-olufsen-beoplay-h8i-h9i-headphones-review.html on Aug. 20, 2020, 25 pgs.
"Bluetooth Headest 2018 Products Catalogue", Patent Office Design Division publication No. HD30005951, Oct. 17, 2018, p. 5, 3 pgs.

* cited by examiner